July 6, 1937.  S. W. FARBER  2,086,357
SEAL FOR COFFEE MAKERS
Filed April 27, 1936
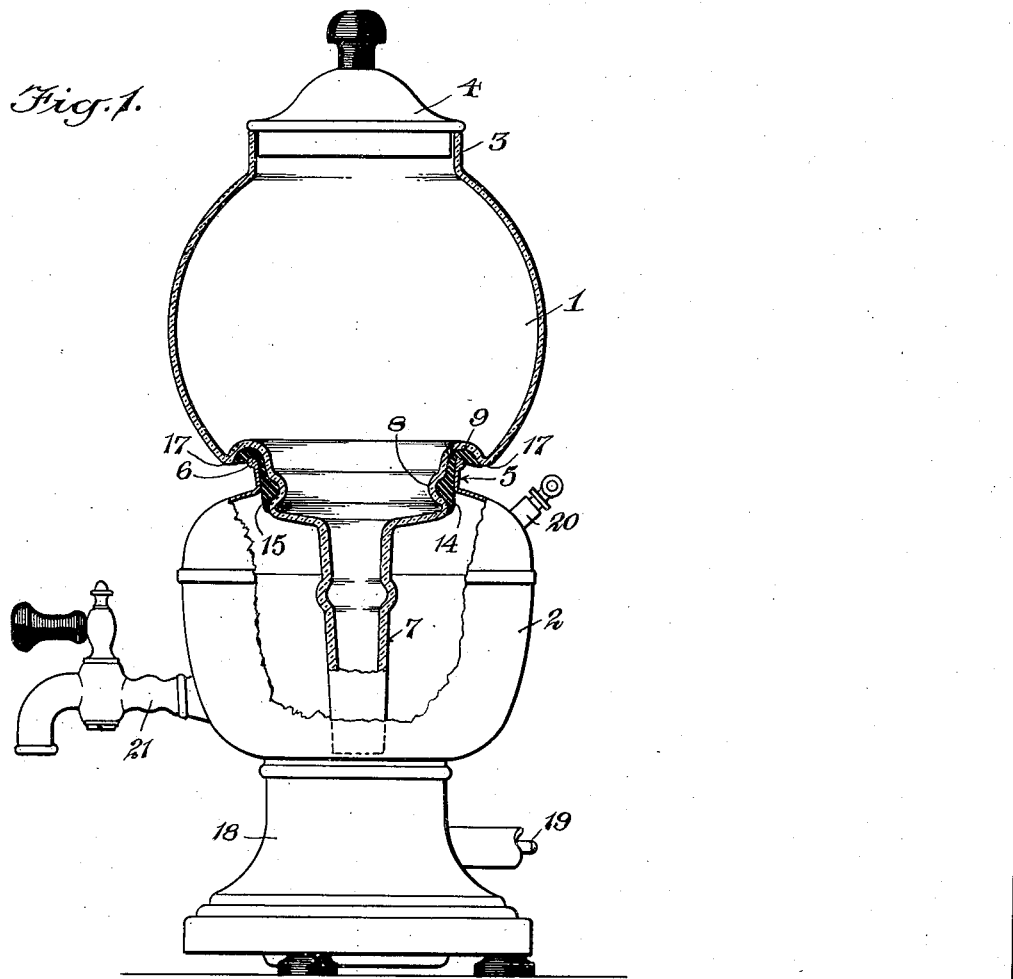
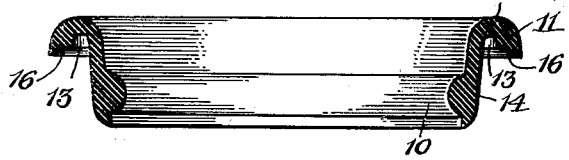
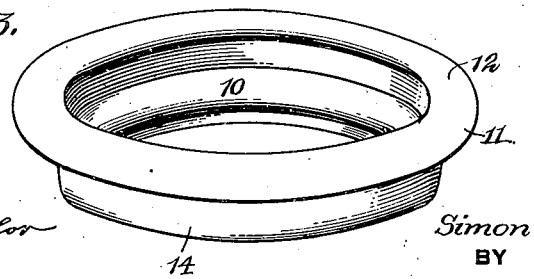
WITNESSES
INVENTOR
Simon W. Farber
BY
ATTORNEYS Patented July 6, 1937

2,086,357

UNITED STATES PATENT OFFICE 2,086,357

SEAL FOR COFFEE MAKERS

Simon W. Farber, Brooklyn, N. Y.

Application April 27, 1936, Serial No. 76,497

1 Claim. (Cl. 53—3)

The present invention relates to a seal for coffee makers of that type embodying an upper and a lower bowl, the upper bowl receiving the ground or pulverized coffee and the lower bowl the water, and in which the upper bowl is removably connected to the lower bowl, in such manner that the boiling water in the lower bowl may pass upwardly into the upper bowl and when the heat is discontinued permitting the infusion to flow back into the lower bowl, after which the upper bowl is removed and the coffee dispensed from the lower bowl. Such coffee makers have long been well known and, excepting as hereinafter set forth, the coffee machine as shown and described constitutes no part of the present invention.

The object of the present invention is to produce an effective seal between the upper and lower bowls and one wherein the connection between the two bowls shall be relatively large in diameter as compared with the maximum horizontal diameters of the bowls, and of such a construction as to produce not only a tight seal but a firm support for the upper bowl; one in which all accidental tipping of the upper bowl when coupled to the lower bowl will be prevented, at the same time facilitating the ready disconnection and removal of the upper bowl when required.

Another object of the invention is to so construct the sealing connection that when in use the sealing device will be entirely hidden from view.

The present invention may be said therefore to consist of a coffee maker having an upper and lower bowl, the upper bowl provided with a recess to receive the sealing ring and the lower bowl provided with a flange to engage the sealing ring which is arranged to overlap the upper edge of the flange and also to engage the inner wall thereof in such manner as to prevent the tipping of the upper bowl, and it further consists of the devices and combinations of devices which will be hereinafter described and claimed.

The present invention is shown in the accompanying drawing in which—

Fig. 1 shows partly in side elevation and partly in vertical section a coffee machine embodying my improved sealing connection, the lower bowl being broken away and other parts being shown in vertical section, and the section being upon a line cutting the axis;

Fig. 2 shows a vertical cross section of the sealing ring in full size; and

Fig. 3 is a perspective view of the sealing ring.

Similar reference characters will be employed to designate corresponding parts.

In the drawing 1 indicates the upper bowl and 2 the lower bowl. The bowls may be made of any suitable material but preferably the lower bowl 2 will be metal and the upper bowl 1 glass. The upper bowl 1 is provided at the top with an opening surrounded by an upstanding flange 3 adapted to receive a removable cap 4. The lower bowl 2 is provided at the top with an upwardly projecting slightly flaring flange 5, the upper edge of which is preferably provided with a bead 6. The flange 5 surrounds the opening into the lower bowl 2 which is preferably of the same diameter as the opening at the top of bowl 1, and the cap 4 may be shifted from the top of bowl 1 to the top of bowl 2 after the bowl 1 has been removed therefrom. The bowl 1 is provided with a downwardly extending integrally formed tubular spout 7 which is open at its lower end and at its upper end leads into a relatively large chamber 8 formed in the base of the bowl 1, whereby the hot water from the bowl 2 may pass upwardly into the bowl 1 and downwardly into the bowl 2. Preferably a suitable filter pad, not shown, will be supported in the chamber upon which the ground or pulverized coffee placed in the upper bowl may rest to be acted upon by the hot water flowing from the lower to the upper bowl.

The wall of the chamber 8 will be shaped as shown in Fig. 1, forming a rounded projection upon its interior and a corresponding groove about its exterior, and the bottom of bowl 1 will be provided with a groove or seat 9 entirely surrounding the chamber 8 where it merges into the wall of the bowl 1.

The sealing ring, preferably formed of rubber or other suitable yielding material, is circular in form and upon its inner wall is provided with a rib 10 arranged to be snapped into and fit snugly in the groove formed in the wall of the chamber 8. About its upper edge the sealing ring is formed with an overhanging flange 11 preferably curved as shown at 12, and of a size to fit the circular groove or seat 9 in the bottom of the bowl 1 as shown in Fig. 1. Upon its under surface the flange 11 will be provided with a seat or groove 13 into which the bead 6 of the flange 5 will fit forming a vapor-tight seal between the bowls 1 and 2. The outer face of the depending wall 14 of the seal will be of a diameter and shape to contact with the inner face of the flange 5 when the parts are assembled as shown in Fig. 1, and as shown therein the sealing ring will be of such depth or height that its lower end will project as shown at 15 into the opening in the top of the lower bowl 2, closing said opening and insuring a firm and stable support for the upper bowl 1. Preferably the overhanging flange 11 will be beveled upon the under surface of the down-turned portion 16 so that when in position the curved portion 12 of the flange will fit accurately into the groove or seat 9 and will be entirely concealed when the bowls are coupled together by the depending portion 17 of the bowl 1 and the flange 5 of the bowl 2.

It will be noted that by reason of the inner rib 10 of the sealing ring it will be firmly connected to the bowl 1 and removable therewith.

When the sealing device is employed in a coffee maker as shown, the bowl 2 may be supported by a base 18 carrying an electric conductor 19 to heat the water in the bowl 2, and the bowl 2 may also be provided with a suitable valve 20 and a faucet 21. However, it will be understood that my invention is not limited to its use with the exact form of coffee maker shown, nor one in which the lower bowl is made of metal and the upper bowl of glass. Any suitable material may be employed, as the present invention resides in the sealing connection between the upper and lower bowl only.

It will be noted that the inner face of the flange 5 of the bowl 2 and the outer face of the downwardly extending wall 14 of the sealing ring are substantially parallel although tapering and flaring outwardly at the top and that therefore, when the sealing ring is supported on the enlargement at the bottom of the bowl 1 and the upper bowl lowered to that extent to bring the bead 6 of the flange 5 into its seat 13 beneath the overhanging flange 11, the outer surface of the wall of the sealing ring will accurately fit within the flange 5 without the necessity of employing any excessive force or pressure in coupling the bowls 1 and 2 in producing a sealing connection between the bowls. Preferably the sealing ring upon its inner surface will be of such a diameter that in order to seat the rib 10 in the groove formed in the enlargement 8 at the lower part of the bowl 1, it will of necessity be required that it be forced into position on said enlargement when assembling the parts. When once applied thereto it will be held firmly thereon by the rib 10 and the seating of the flange 12 in the annular groove 9. Thus while the sealing ring, because of its elastic character, will snugly engage the enlargement at the base of the bowl 1 and will be at all times removable therewith, it will have only a fitting contact with the inner wall of the flange 5 when the upper edge of the flange 5 enters the seat 13. Of course the upper bowl will be provided with the usual filter pad (not shown) which fits over the opening to the chamber at the upper end of the spout 7 and will be held in position by any suitable means.

I claim:

In a coffee maker of the class described, an upper bowl having at its lower portion a chamber and a depending tubular spout, a groove or seat formed in the wall of the bottom of the upper bowl and merging into the wall of said chamber, a groove or seat in the wall of the chamber, an elastic sealing ring mounted upon and surrounding the chamber, said sealing ring having at the top an outwardly extending overhanging sealing flange fitting within the groove or seat formed in the wall of the upper bowl and also having a depending wall, a rib upon the inner face of the wall of the sealing ring fitting the groove or seat in the wall of the chamber to hold the sealing ring thereon with the overhanging sealing flange seated in the groove or seat in the bottom of the upper bowl.

SIMON W. FARBER.